United States Patent [19]
Breidenbach et al.

[11] Patent Number: 5,961,388
[45] Date of Patent: Oct. 5, 1999

[54] SEAL FOR SLIP YOKE ASSEMBLY

[75] Inventors: Kevin J. Breidenbach, Perrysburg; James L. Oess, Toledo; Martin J. Pearson, Toledo; Thomas J. Saba, Jr., Toledo, all of Ohio

[73] Assignee: Dana Corporation, Toledo, Ohio

[21] Appl. No.: 08/935,349

[22] Filed: Sep. 22, 1997

Related U.S. Application Data

[63] Continuation-in-part of application No. 08/601,147, Feb. 13, 1996, abandoned.

[51] Int. Cl.$^6$ .......................................................... F16D 3/84
[52] U.S. Cl. ........................... 464/133; 277/630; 277/636; 464/175
[58] Field of Search ...................................... 464/173, 175, 464/170, 130, 134, 157, 158, 162; 403/348, 350, 349; 277/636, 551, 630, 637

[56] References Cited

U.S. PATENT DOCUMENTS

| | | |
|---|---|---|
| 3,063,266 | 11/1962 | Rabson . |
| 3,367,142 | 2/1968 | Groves et al. . |
| 3,371,937 | 3/1968 | Maeda ...................................... 277/189 |
| 4,131,286 | 12/1978 | Bainard . |
| 4,460,183 | 7/1984 | Brissette . |
| 4,556,106 | 12/1985 | Evans ....................................... 277/189 |
| 4,575,360 | 3/1986 | Brissette ................................... 464/133 |
| 4,580,996 | 4/1986 | Brissette ................................... 464/133 |
| 4,695,061 | 9/1987 | Meisner et al. . |
| 4,883,029 | 11/1989 | Winston .................................. 277/181 |
| 5,078,533 | 1/1992 | Madonio et al. ........................ 403/133 |
| 5,188,399 | 2/1993 | Durina ..................................... 403/348 |
| 5,230,660 | 7/1993 | Warnke .................................... 277/189 |
| 5,261,758 | 11/1993 | Vranish .................................... 403/348 |

FOREIGN PATENT DOCUMENTS

| | | | |
|---|---|---|---|
| 1568210 | 5/1980 | United Kingdom | ................... 403/349 |

*Primary Examiner*—Eileen Dunn Lillis
*Attorney, Agent, or Firm*—MacMillan, Sobanski & Todd, LLC

[57] ABSTRACT

A seal between two telescoping members in a slip yoke assembly including a driveshaft section and a slip yoke. A circumferential groove is formed in the outer surface of one of the telescoping members of the slip yoke assembly. The groove defines an annular collar which extends circumferentially about the end of the slip yoke. One or more recesses are formed in the bottom of the groove. Additionally, one or more axially extending slots are formed through the collar. Preferably, the slots are angularly offset from the associated recesses by a predetermined amount. One or more radially inwardly extending protrusions are formed at one end of the seal. To install the seal on the slip yoke, the seal is initially oriented relative to the end of the hollow cylindrical end portion such that the protrusions are axially aligned with the slots. Then, the seal is moved toward the slip yoke until the protrusions engage the outer end surface of the slip yoke axially adjacent the slots. Axial movement of the seal continues until the protrusions of the sealing member are circumferentially aligned with the groove. At that point, the seal is rotated such that the protrusions move circumferentially through the groove. Such rotation is continued until the protrusions snap into the recesses formed in the bottom of the groove to quickly and easily retain the seal on the end of the slip yoke.

20 Claims, 5 Drawing Sheets

SEAL FOR SLIP YOKE ASSEMBLY

CROSS REFERENCE TO RELATED APPLICATIONS

This application is a continuation-in-part of application Ser. No. 08/601,147, filed Feb. 13, 1996 now abandoned.

BACKGROUND OF THE INVENTION

This invention relates in general to drive train assemblies for transferring rotational power from an engine to an axle assembly in a vehicle. In particular, this invention relates to an improved structure for providing a seal between two telescoping members in a slip yoke assembly adapted for use in such a vehicle drive train assembly.

In most land vehicles in use today, a drive train assembly is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must the drive train assembly accommodate a limited amount of angular misalignment between the engine/transmission assembly and the axle assembly, but it must also typically accommodate a limited amount of axial movement therebetween. A small amount of such relative axial movement frequently occurs when the vehicle is operated. To address this, it is known to provide one or more slip yoke assemblies in the drive train assembly. A typical slip yoke assembly includes first and second splined members which are connected to respective components of the drive train assembly. The splined members provide a rotational driving connection between the components of the drive train assembly, while permitting a limited amount of axial misalignment therebetween. In some instances, the first splined member may be provided on the end of a yoke member connected to a universal joint assembly, while the second splined member may be connected to a portion of the driveshaft of the drive train assembly.

As is well known in the art, most slip yoke assemblies are provided with one or more seals to prevent the entry of dirt, water, and other contaminants into the region where the splined members engage one another. Such contaminants can adversely affect the operation of the slip yoke assembly and cause premature failure thereof Exterior seals are typically disposed on the outer surface of the slip yoke assembly to prevent contaminants from entering into the region where the splined members engage one another from the exterior environment. A number of external seals are known in the art for use with conventional slip yoke assemblies. For example, a typical exterior seal includes a rigid annular housing which is mounted on the outer surface of the female splined member. A resilient annular seal is supported on the housing and extends radially inwardly into sliding and sealing engagement with the outer surface of the male splined member to provide the seal. Another example of an external seal is a convoluted boot which is positioned over the splined members of a slip yoke assembly. One end of the convoluted boot is fastened to the female splined member and the other end is fastened to the male splined member. The length of the convoluted boot can expand or contract to accommodate the axial movement between the splined members of the slip yoke assembly.

Several structures are known in the art for mounting the rigid annular housing of a seal or the ends of a convoluted boot. In one known structure, the ends of either the seal housing or an end of the convoluted boot and the female splined member are formed having mating threads which allow the seal housing or the end of the convoluted boot to be threaded onto the end of the female splined member. In another known structure, a portion of the seal housing or the end of the convoluted boot is crimped or otherwise deformed about the end of the female splined member. In yet another known structure, a band clamp or other mechanical fastener is used to retain the seal housing or the end of the convoluted boot on the end of the female splined member. Although these known structures have been effective, it has been found that they are relatively expensive or time consuming in structure and installation. Thus, it would be desirable to provide an improved structure for providing a seal between two telescoping members in a slip yoke assembly adapted for use in such a vehicle drive train assembly which is relatively simple and inexpensive in structure and installation.

SUMMARY OF THE INVENTION

This invention relates to an improved structure for providing a seal between two telescoping members in a slip yoke assembly adapted for use in a vehicle drive train assembly which is relatively simple and inexpensive in structure and installation. A driveshaft section having splined members is engaged with splined members formed on a slip yoke to provide a rotational driving connection therebetween, while permitting a limited amount of axial misalignment therebetween. A seal is mounted on the slip yoke assembly to prevent contaminants from entering into the region where the splined members engage one another from the exterior environment.

A circumferential groove is formed in the outer surface of an end portion of one of the two telescoping members of the slip yoke assembly, e.g., either the slip yoke or the driveshaft. The groove defines an annular collar extending circumferentially about the end of the slip yoke or drive shaft. One or more recesses are formed in the bottom of the groove. Additionally, one or more axially extending slots are formed through the collar. Preferably, the slots are angularly offset from the associated recesses by a predetermined amount. One or more radially inwardly extending protrusions are formed at a first end of the seal. To install the first end of the seal on the respective slip yoke or driveshaft, the seal is initially oriented relative to the end portion such that the protrusions are axially aligned with the slots. Then, the seal is moved toward the slip yoke or driveshaft until the protrusions engage the outer end surface thereof axially adjacent the slots. Axial movement of the seal continues until the protrusions of the seal are circumferentially aligned with the groove. At that point, the seal is rotated such that the protrusions move circumferentially through the groove. Such rotation is continued until the protrusions snap into the recesses formed in the bottom of the groove to quickly and easily retain the seal on the end of the slip yoke.

In a first embodiment of the invention, the seal includes a rigid tubular housing member having a resilient elastomeric sealing member secured thereto. The protrusions are formed in the sealing member. The seal includes a sealing lip having a somewhat convoluted shape and defines an inner diameter which is slightly smaller than an outer diameter defined by the first driveshaft section. The sealing lip slidably and sealingly engages an outer surface of the other of the slip yoke or driveshaft to prevent dirt and other contaminants from entering into the region of the cooperating splines. In a second embodiment of the invention, the seal is a convoluted boot having first and second ends and a convoluted portion extending therebetween. The protrusions are formed on the first end. The second end can be fastened to an outer portion of the other of the slip yoke of driveshaft in a conventional manner, such as by a band clamp.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
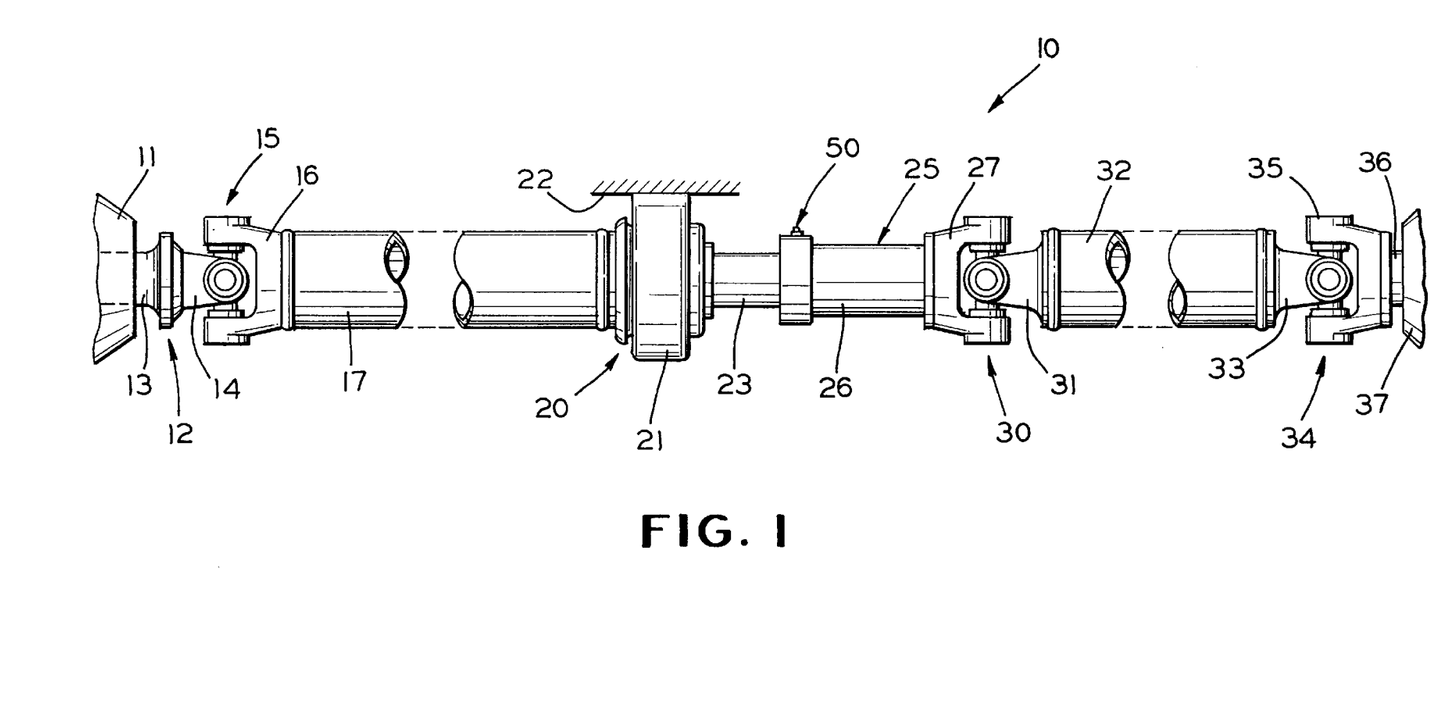
FIG. 1 is a side elevational view of vehicle drive train assembly including a slip yoke assembly for connecting a rearward end of a first driveshaft tube section to a forward end of a second driveshaft tube section and a seal in accordance with this invention extending between the two driveshaft tubes.

Referring now to the drawings, there is illustrated in FIG. 1 a drive train assembly, indicated generally at 10, for a vehicle which is adapted to transmit rotational power from an engine/transmission assembly 11 to a plurality of driven wheels (not shown). The engine/transmission assembly 11 is conventional in the art is and includes an externally splined output shaft (not shown) which is connected to a first slip yoke assembly, indicated generally at 12. The first slip yoke assembly 12 is conventional in the art and includes an internally splined tubular end portion 13 which slidably engages the externally splined output shaft of the engine/transmission assembly 11. As a result, the tubular end portion 13 of the first slip yoke assembly 12 is rotatably driven by the output shaft of the engine/transmission assembly 11, but is free to move axially relative thereto to a limited extent.

The first slip yoke assembly 12 further includes a yoke 14, which forms one part of a first universal joint assembly, indicated generally at 15. The first universal joint assembly 15 is also conventional in the art and includes a tube yoke 16 which is connected to the yoke 14 by a cross in a known manner. The tube yoke 16 is secured, such as by welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of axial misalignment therebetween. The first universal joint assembly 15 also permits a limited amount of relative axial movement to occur between the output shaft of the engine/transmission assembly 11 and the first driveshaft section 17. Alternatively, the output shaft of the engine/transmission assembly 11 may terminate in a conventional end yoke (not shown) which is directly connected to the cross of the first universal joint assembly 15. Such a structure would not accommodate any relative axial movement to occur between the output shaft of the engine/transmission assembly 11 and the first driveshaft section 17.

The first driveshaft section 17 extends through and is supported for rotation by a center bearing assembly, indicated generally at 20. The center bearing assembly 20 is conventional in the art and includes a rigid frame or bracket 21 which is secured to a portion of a frame, chassis, or body 22 of the vehicle. The first driveshaft section 17 terminates in a second reduced diameter end 23. A portion of the outer surface of the reduced diameter end 23 of the first driveshaft section 17 is formed having a plurality of external splines 23a (see FIG. 2). A slip yoke, indicated generally at 25, is connected to the reduced diameter end 23 of the first driveshaft section 17 for rotation therewith. The slip yoke 25 includes a hollow cylindrical end portion 26 and a yoke portion 27. The inner surface of the hollow cylindrical end portion 26 is formed having a plurality of internal splines 26a (see FIG. 2). The internal splines 26a formed on the cylindrical end portion 26 cooperate in an known manner with the external splines 23a formed on the reduced diameter end portion 23 so as to permit a limited amount of relative axial movement to occur between the slip yoke 25 and the first driveshaft section 17. The yoke portion 27 is formed having a pair of opposed yoke arms having respective openings formed therethrough which are adapted to cooperate with a universal joint cross in a conventional manner. An annular external seal, indicated generally at 50, is mounted on the hollow cylindrical end portion 26 of the slip yoke 25 and slidably and sealingly engages the outer surface of the reduced diameter end portion 23 of the first driveshaft section 17. The structure and operation of the seal 50 will be explained in detail below.

The yoke portion 27 of the slip yoke 25 forms one part of a second universal joint assembly, indicated generally at 30. The second universal joint assembly 30 is also conventional in the art and includes a tube yoke 31 which is connected to the slip yoke 27 by a cross in a known manner. The tube yoke 31 is secured, such as by welding, to a first end of a second driveshaft section 32 for rotation therewith. The first universal joint assembly 30 thus provides a rotational driving connection between the first driveshaft section 17 and the second driveshaft section 32, while permitting a limited amount of axial misalignment therebetween. The second driveshaft section 32 terminates in a second end having a tube yoke 33 secured thereto. The tube yoke 33 forms one part of a third universal joint assembly, indicated generally at 34. The third universal joint assembly 34 is also conventional in the art and includes a tube yoke 35 which is connected to an input shaft 36 of an axle assembly 37 by a cross in a conventional manner. The third universal joint assembly 34 thus provides a rotational driving connection between the second driveshaft section 32 and the input shaft 36 of the axle assembly 37, while permitting a limited amount of axial misalignment therebetween. The axle assembly 37 is conventional in the art and is adapted to transmit rotational power from the input shaft 36 to the driven wheels of the vehicle in a known manner.

Figure 2:
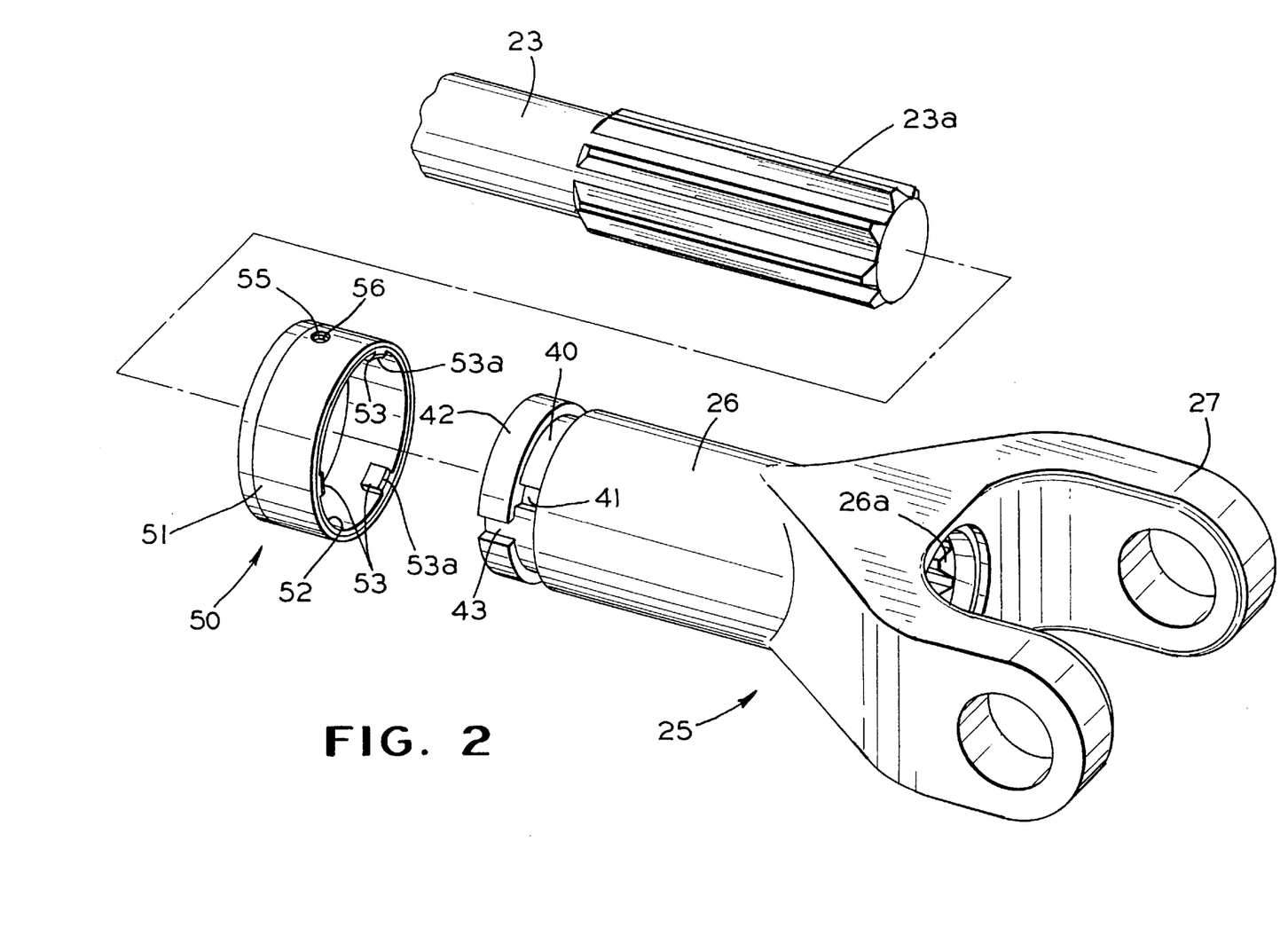
FIG. 2 is an enlarged and exploded perspective view of the slip yoke assembly and seal illustrated in FIG. 1.
Figure 3:
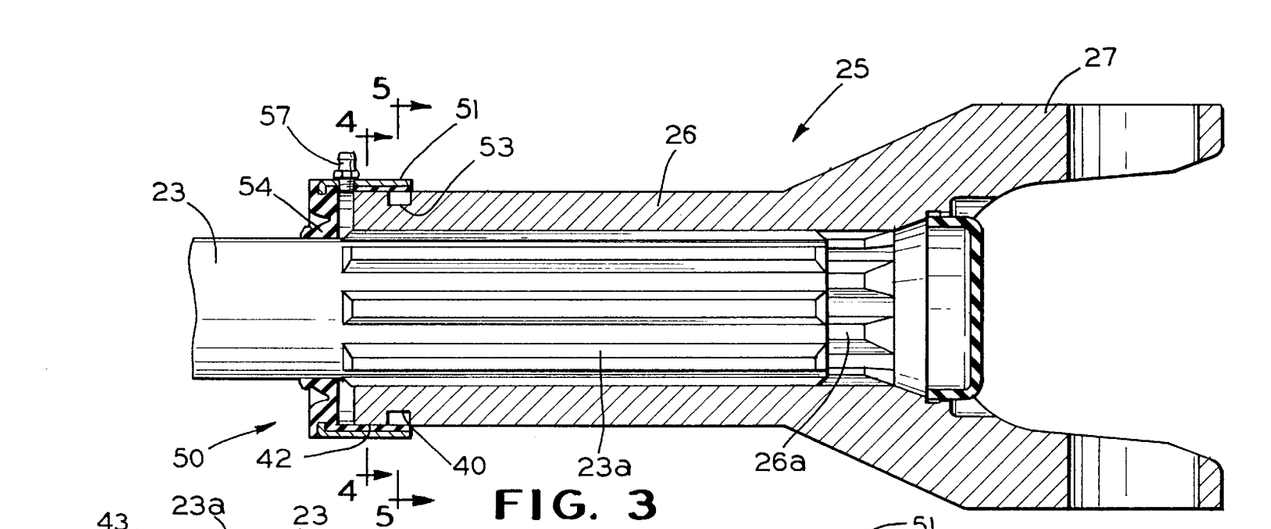
FIG. 3 is an enlarged sectional elevational view of the slip yoke assembly and seal illustrated in FIG. 2 shown assembled.
Figure 4:
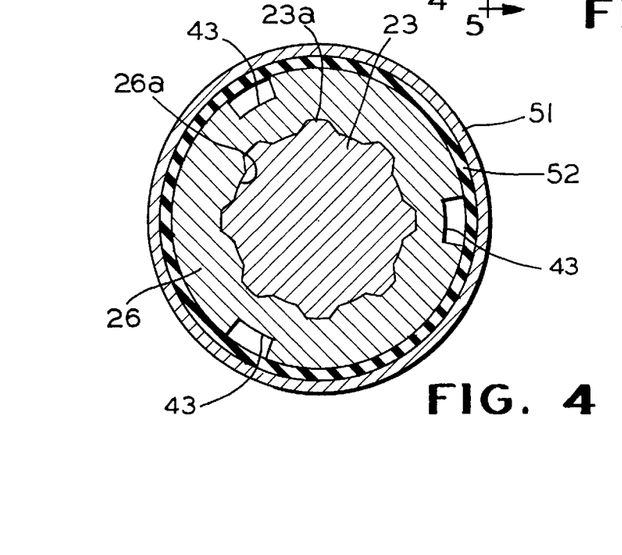
FIG. 4 is sectional elevational view taken along line 4—4 of FIG. 3.
Figure 5:
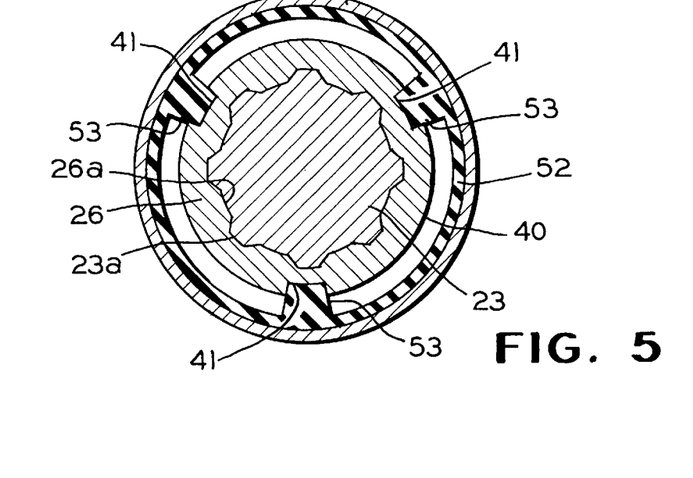
FIG. 5 is sectional elevational view taken along line 5—5 of FIG. 3.

Referring now to FIGS. 2 and 3, the structure of the slip yoke 25 and seal 50 are illustrated in detail. As shown therein, a circumferential groove 40 is formed in the outer surface of the hollow cylindrical end portion 26 of the slip yoke 25 adjacent to the end opposite of the yoke portion 27. The illustrated groove 40 defines an axial length which is generally constant about the entire circumference thereof. It will be appreciated, however, that the groove 40 may extend only partially about the circumference of the hollow cylindrical end portion 26 of the slip yoke 25. The illustrated groove 40 defines an outer diameter which is generally constant about the entire circumference thereof. However, one or more recesses 41 are formed in the bottom of the groove 40. In the illustrated embodiment, three equidistantly spaced recesses 41 are formed in the bottom of the groove 40.

The groove 40 defines an annular collar 42 which extends circumferentially about the end of the hollow cylindrical end portion 26 of the slip yoke 25. One or more axially extending slots 43 are formed through the collar 42. In the illustrated embodiment, three equidistantly spaced axial slots 43 are formed through the collar 42, one for each of the recesses 41. Preferably, the slots 43 are angularly offset from the associated recesses 41 by the same predetermined amount, such as 10° for example. Also, it is preferable that the depths of each of the slots 43 be approximately the same as the depth of the annular groove 40, and further that they define a predetermined circumferential width. Typically, the slip yoke 25 is formed by a conventional casting process. The groove 40, the recesses 41, and the slots 43 can all be formed during the casting process by providing an appropriate mold. Alternatively, the groove 40, the recesses 41, and the slots 43 can be formed in the slip yoke 25 after the casting process, such as by machining. The purposes of the groove 40, the recesses 41, and the slots 43 will be explained below.

The seal 50 includes a housing member 51 having a resilient sealing member 52 secured thereto. The outer housing member 51 is preferably tubular in shape and is preferably formed from a relatively thin and rigid material, such as metal or plastic. The sealing member 52 is preferably formed from an elastomeric material, such as nitrile butadiene rubber. The sealing member 52 may be molded to the housing member 51 so as to be secured thereto. However, the sealing member 52 may be secured to the housing member 51 by any other means, such as by adhesive. One or more radially inwardly extending protrusions 53 are formed at one end of the sealing member 52. In the illustrated embodiment, three equidistantly spaced protrusions 53 are formed at the one end of the sealing member 52, one for each of the slots 43 and the recesses 41.

The protrusions 53 define an axial length which is slightly smaller than the axial length defined by the groove 40. The protrusions 53 also define an inner diameter which is slightly smaller than the outer diameter defined by the groove 40 and the slots 43 formed in the slip yoke 25. Lastly, each of the protrusions 53 defines a circumferential width which is slightly smaller than the circumferential width defined by each of the slots 43. Also, each of the protrusions 53 may be formed having an inner chamfered edge 53a. An annular sealing lip 54 is formed at the other end of the sealing member 52, opposite the protrusions 53. The sealing lip 54 has a somewhat convoluted shape and defines an inner diameter which is slightly smaller than an outer diameter defined by the reduced diameter portion 23 of the first driveshaft section 17. The purposes of the protrusions 53 and the sealing lip 54 will be explained below.

In the illustrated embodiment, aligned radially extending apertures 55 and 56 are formed through the housing member 51 and the sealing member 52, respectively, of the seal 50. These aligned apertures are provided to facilitate the installation of a lubrication fitting 57 in the seal 50. The lubrication fitting 57 is conventional in the art and is provided to permit the one-way flow of lubricant therethrough from the exterior of the seal 50 to the interior thereof. The operation of the lubrication fitting 57 will be explained below.

To install the seal 50 on the slip yoke 25, the housing 51 is initially oriented relative to the end of the hollow cylindrical end portion 26 such that the protrusions 53 are axially aligned with the slots 43, as shown in FIG. 2. Then, the seal 50 is moved toward the slip yoke 25 until the protrusions 53 engage the outer end surface of the slip yoke 25 axially adjacent the slots 43. As mentioned above, the protrusions 53 define an inner diameter which is slightly smaller than the outer diameter defined by the groove 40 and the slots 43 formed in the slip yoke 25. The chamfered edges 53a are provided to engage the outer end surface of the slip yoke 25 axially adjacent the slots 43 and compress the protrusions 53 of the resilient sealing member 51 radially outwardly so that they may slide axially through the slots 43. Axial movement of the seal 50 continues until the protrusions 53 of the sealing member 51 are circumferentially aligned with the groove 40. At that point, the seal 50 is rotated such that the protrusions 53 slide circumferentially through the groove 40. Such rotation is continued until the protrusions 53 snap into the recesses 41 formed in the bottom of the groove 40.

Thus, it will be appreciated that the seal 50 can be installed on the slip yoke 25 quickly and easily, without the use of any specialized tools or supporting hardware. Once installed as described above, the protrusions 53 cooperate with the collar 42 defined by the groove 40 to positively retain the seal 50 on the slip yoke 25. The protrusions 53 also cooperate with the recesses 41 to normally restrain the seal 50 from rotating relative to the slip yoke 25 during use. However, such rotation can be manually accomplished by hand if it is desired to remove the seal 50 for service or replacement. Furthermore, it can be seen that this retaining structure is essentially cost-free, inasmuch as the groove 40, the recesses 41, and the slots 43 can be formed during the casting of the slip yoke 25 and the protrusions 53 can be formed during the molding of the sealing member 51. Once installed, lubricant can be injected into the region of the mating splines 23a and 26a respectively formed on the reduced diameter portion 23 of the first driveshaft section 17 and the hollow cylindrical end portion 26 of the slip yoke 25.

Figure 6:
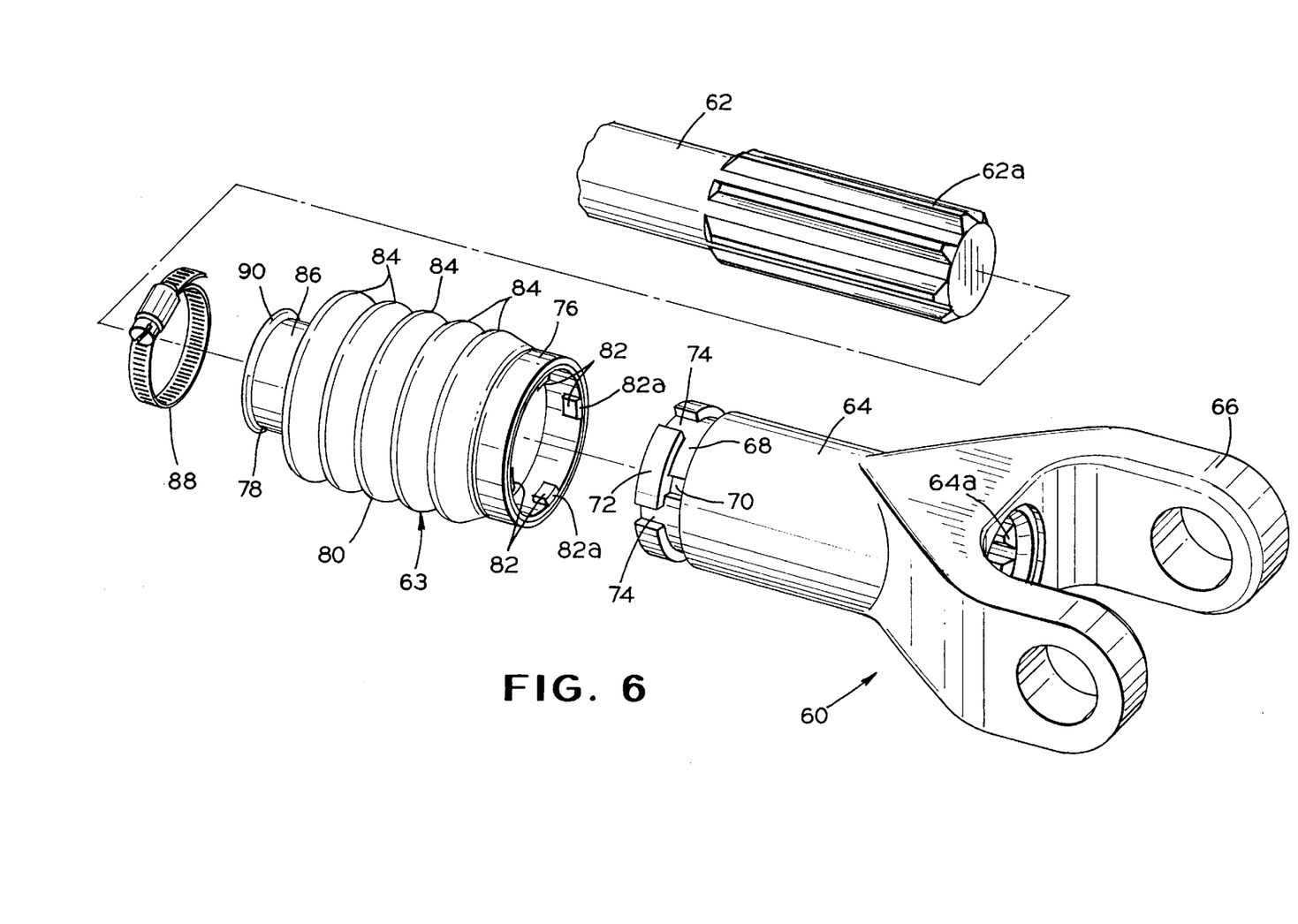
FIG. 6 is an exploded perspective view of a first alternative embodiment of a slip yoke assembly and a convoluted boot seal in accordance with this invention.

Referring now to FIG. 6, there is illustrated a slip yoke 60 and a reduced diameter portion 62 of a driveshaft section. The slip yoke 60 and the reduced portion 62 are similar in structure and function to the slip yoke 25 and reduced diameter portion 23 of the drive shaft section 17 illustrated in FIGS. 1 through 5. In lieu of the annular external seal assembly 50, however, an alternative seal in the form of a convoluted boot 63 is used to seal the splined connection between the slip yoke 60 and the reduced diameter portion 62. The structure and function of the convoluted boot 63 will be discussed in detail below. The slip yoke 62 includes a hollow cylindrical end portion 64 and a yoke portion 66. The inner surface of the hollow cylindrical end portion 64 is formed having a plurality of internal splines 64a. The internal splines 64a formed on the cylindrical end portion 64 cooperate in a known manner with external splines 62a formed on the reduced diameter end portion 62 so as to permit a limited amount of relative axial movement to occur between the slip yoke 60 and the first driveshaft section 17. The yoke portion 66 is formed having a pair of opposed yoke arms having respective openings formed therethrough which are adapted to cooperate with a universal joint cross (not shown) in a conventional manner.

A circumferential groove 68 is formed in the outer surface of the hollow cylindrical end portion 64 of the slip yoke 60 adjacent the end opposite of the yoke portion 66. The illustrated groove 68 defines an axial length which is generally constant about the entire circumference thereof. It will be appreciated, however, that the groove 68 may extend only partially about the circumference of the hollow cylindrical end portion 64 of the slip yoke 60. The illustrated groove 68 defines an outer diameter which is generally constant about the entire circumference thereof. However, one or more recesses 70 are formed in the bottom of the groove 68. In the illustrated embodiment, four equidistantly spaced recesses 70 are formed in the bottom of the groove 68. The groove 68 defines an annular collar 72 which extends circumferentially about the end of the hollow cylindrical end portion 64 of the slip yoke 60.

One or more axially extending slots 74 are formed through the collar 72. In the illustrated embodiment, four equidistantly spaced axial slots 74 are formed through the collar 72, one for each of the recesses 70. Preferably, the slots 74 are angularly offset from the associated recesses 70 by the same predetermined amount, such as 10° for example. Also, it is preferable that the depths of each of the slots 74 be approximately the same as the depth of the annular groove 68, and further that they define a predetermined circumferential width. Typically, the slip yoke 60 is formed by a conventional casting process. The groove 68, the recesses 70, and the slots 74 can all be formed during the casting process by providing an appropriate mold. Alternatively, the groove 68, the recesses 70, and the slots 74 can be formed in the slip yoke 60 after the casting process, such as by machining.

The convoluted boot 63 includes first and second ends 76 and 78 and an intermediate convoluted portion 80. Preferably, the convoluted boot 63 is generally tubular in shape and formed from an elastomeric material. One or more radially inwardly extending protrusions 82 are formed on the inner surface of the first end 76 of the convoluted boot 63. The protrusions 82 function similarly to the protrusions 53 of the seal 50. In the illustrated embodiment, four equidistantly spaced protrusions 82 are formed on the inner surface of the first end 76 of the convoluted boot 63, one for each of the slots 74 and the recesses 70.

The protrusions 82 define an axial length which is slightly smaller than the axial length defined by the groove 68. The protrusions 82 also define an inner diameter which is slightly smaller than the outer diameter defined by the groove 68 and the slots 70 formed in the slip yoke 60. Lastly, each of the protrusions 82 defines a circumferential width which is slightly smaller than the circumferential width defined by each of the slots 74. Also, each of the protrusions 82 may be formed having a chamfered leading edge 82a. The convoluted boot 63 may optionally have one or more apertures (not shown) formed therethrough to permit the installation of lubrication fittings (not shown). The lubrication fittings permit the one-way flow of lubricant therethrough from the exterior of the convoluted boot 63 to the interior thereof. The convoluted portion 80 comprises a plurality of bellows or creases 84 to permit the convoluted boot 63 to longitudinally expand and contract when the first end 76 is moved relative to the second end 78, the reason for which will be explained in detail below. The convoluted portion 80 can be any suitable length, and have any number of creases 84. The second end 78 of the convoluted boot 63 has a cylindrical outer surface 86. As will be described in detail below, the second end 78 of the convoluted boot 63 is fastened and sealed to the reduced diameter portion 62 of the driveshaft section. The second end 78 can be fastened by any suitable means, such as by a band clamp 88. The second end 78 of the convoluted boot 63 may include a radially extending lip 90 to help in preventing the band clamp 88 from becoming dislodged from the cylindrical outer surface 86 of the second end 78.

To install the convoluted boot 63 on the slip yoke 60 and the reduced diameter portion 62 of a driveshaft, the first end 76 of the convoluted boot 63 is initially oriented relative to the end of the hollow cylindrical end portion 64 such that the protrusions 82 are axially aligned with the slots 74, as shown in FIG. 6. Then, the first end 76 of the convoluted boot 63 is moved axially toward the slip yoke 60 until the protrusions 82 engage the outer end surface of the slip yoke 60 axially adjacent the slots 74. As mentioned above, the protrusions 82 define an inner diameter which is slightly smaller than the outer diameter defined by the groove 68 and the slots 74 formed in the slip yoke 60. The chamfered edges 82a are provided to engage the outer end surface of the slip yoke 60 axially adjacent the slots 74 and expand the protrusions 82 of the convoluted boot 63 radially outwardly so that they may slide axially through the slots 74. Axial movement of the first end 76 continues until the protrusions 82 are circumferentially aligned with the groove 68. At that point, the first end 76 of the convoluted boot 63 is rotated relative to the slip yoke 60 such that the protrusions 82 slide circumferentially through the groove 68. Such rotation is continued until the protrusions 82 snap into the recesses 70 formed in the bottom of the groove 68.

The second end 78 of the convoluted boot 63 is positioned over the reduced diameter portion 62 such that the outer cylindrical surface 86 of the second end 78 is aligned radially outwardly from the non-splined area of the reduced diameter portion 62. The second end 78 is then fastened to the reduced diameter portion 62, such as by the band clamp 88. The band clamp 88 is positioned over the outer cylindrical surface 86 and then radially tightened to provide a seal between the second end 78 of the convoluted boot 63 and the smooth outer cylindrical surface of the reduced diameter portion 62. Once installed, lubricant can be injected into the region of the mating splines 62a and 64a respectively formed on the reduced diameter portion 62 and the hollow cylindrical end portion 64 of the slip yoke 60. Of course, lubricant can be injected into the region of the mating splines 62a and 64a prior to the installation of the convoluted boot 63. The order in which the first and second ends 76 and 78 of the convoluted boot 63 are installed can be reversed from that discussed above. If desired, a rigid housing member (not shown), similar to the housing member 51 of the annular seal 50, can be attached to the first end 76 of the convoluted boot 63 to provide additional support therefor.

Figure 7:
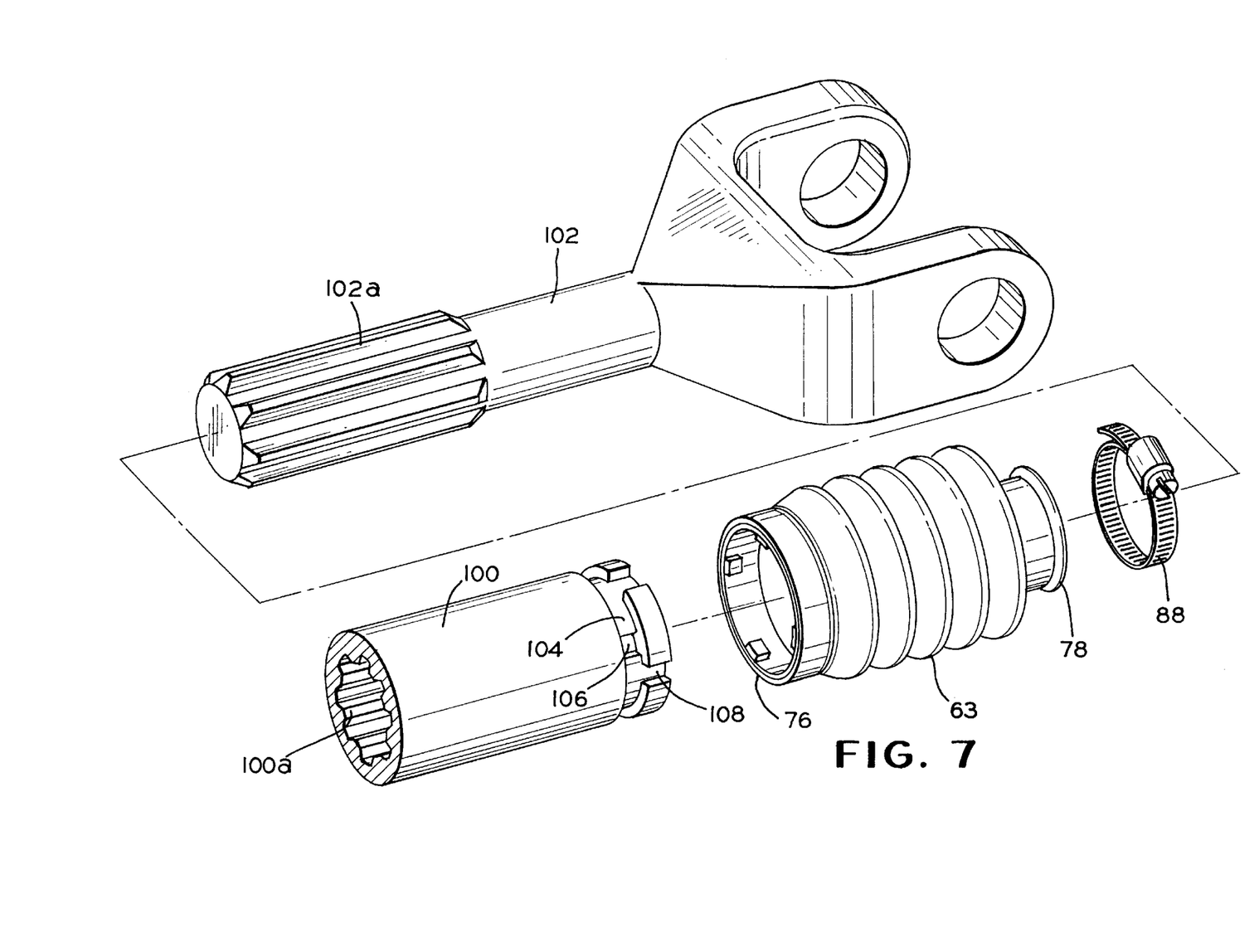
FIG. 7 is an exploded perspective view of a second alternative embodiment of a slip yoke assembly and a convoluted boot seal in accordance with this invention.

Referring now to FIG. 7, there is shown a hollow driveshaft section 100 and a slip yoke 102 having different structural features from those illustrated in FIGS. 1 through 6. The driveshaft section 100 has internal splines 100a formed therein which cooperate with external splines 102a formed on a cylindrical end portion of the slip yoke 102. The splines 100a and 102a cooperate to provide a rotational driving connection between the driveshaft section 100 and the slip yoke 102, while permitting a limited amount of axial misalignment therebetween. The splines 100*a* and 102*a* are sealed from the exterior environment by the convoluted boot 63. The convoluted boot 63 is installed in a similar manner as described above, except that the first end 76 of the convoluted boot 63 is fastened to the driveshaft section 100 and the second end 78 is fastened to the slip yoke 102. The driveshaft section 100 has a circumferential groove 104, recesses 106, and slots 108 which cooperate with the first end 76 of the convoluted boot 63 to form an attachment therebetween. The second end 78 of the convoluted boot 63 can be fastened to the slip yoke 102 by means of the band clamp 88.

Although the illustrated convoluted boot 63 is shown and described as having a single end formed with radially extending protrusions, it is contemplated that a convoluted boot (not shown) can be manufactured having first and second ends which are both formed with protrusions as described above. The first and second ends of the convoluted boot would then mate with cooperating appropriately shaped ends of a driveshaft section and a slip yoke.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A yoke comprising:

a yoke portion including a pair of yoke arms; and an end portion extending from said yoke portion to an end, said end portion having a groove formed in an outer surface thereof that is spaced apart from said end to define a collar, said groove having an inwardly extending recess formed therein.

2. The yoke defined in claim 1 wherein said groove extends completely about said end portion of said slip yoke.

3. The yoke defined in claim 1 wherein said groove has a plurality of recesses formed therein.

4. The yoke defined in claim 1 further including a slot formed through said collar which extends from said end of said end portion to said groove.

5. The yoke defined in claim 4 wherein a plurality of slots are formed through said collar which extend from said end of said end portion to said groove.

6. The yoke defined in claim 1 wherein said groove extends completely about said end portion of said slip yoke, and wherein a slot is formed through said collar which extends from said end of said end portion to said groove, said slot being offset along the circumference of said end portion from said recess.

7. The yoke defined in claim 1 wherein said groove extends completely about said end portion of said slip yoke and has a plurality of recesses formed therein, and wherein a plurality of slots is formed through said collar which extend from said end of said end portion to said groove, said slots being offset along the circumference of said end portion from said recesses.

8. The yoke defined in claim 1 wherein said end portion is hollow so as to define an inner surface, and wherein a plurality of splines is formed on said inner surface.

9. A yoke and seal assembly comprising:

a yoke including a yoke portion including a pair of yoke arms and an end portion extending from said yoke portion to an end, said end portion having a groove formed in an outer surface thereof which is spaced apart from said end to define a collar, said groove having an inwardly extending recess formed therein; and a sealing member having a protrusion formed at a first end thereof that extends inwardly into said recess.

10. The yoke and seal assembly defined in claim 9 wherein said sealing member includes a housing and a resilient sealing member carried on said housing, said protrusion being formed on said resilient sealing member.

11. The yoke and seal assembly defined in claim 10 wherein an annular sealing lip is formed at a second end of said resilient sealing member.

12. The yoke and seal assembly defined in claim 9 wherein said sealing member includes a hollow boot, said protrusion being formed on said hollow boot.

13. The yoke and seal assembly defined in claim 12 wherein said hollow boot is formed from a flexible material.

14. The yoke and seal assembly defined in claim 12 wherein said hollow boot is formed having a plurality of convolutions.

15. A drive shaft and seal assembly comprising:

a drive shaft including an end portion extending to an end, said end portion having a groove formed in an outer surface thereof which is spaced apart from said end to define a collar, said groove having an inwardly extending recess formed therein; and a sealing member having a protrusion formed at a first end thereof that extends inwardly into said recess.

16. The drive shaft and seal assembly defined in claim 15 wherein said sealing member includes a housing and a resilient sealing member carried on said housing, said protrusion being formed on said resilient sealing member.

17. The drive shaft and seal assembly defined in claim 16 wherein said protrusion is formed at a first end of said resilient sealing member, and wherein an annular sealing lip is formed at a second end of said resilient sealing member.

18. The drive shaft and seal assembly defined in claim 15 wherein said sealing member includes a hollow boot, said protrusion being formed on said hollow boot.

19. The drive shaft and seal assembly defined in claim 18 wherein said hollow boot is formed from a flexible material.

20. The drive shaft and seal assembly defined in claim 18 wherein said hollow boot is formed having a plurality of convolutions.

* * * * *

UNITED STATES PATENT AND TRADEMARK OFFICE
CERTIFICATE OF CORRECTION

PATENT NO. : 5,961,388

DATED : October 5, 1999

INVENTOR(S) : Kevin J. Breidenbach, et al.

It is certified that error appears in the above-identified patent and that said Letters Patent is hereby corrected as shown below:

Page 1, change the inventor's name from Thomas J. Saba, Jr. to Thomas J. Saba, Sr.

Signed and Sealed this

Eleventh Day of July, 2000

*Attest:*

Q. TODD DICKINSON

*Attesting Officer*     *Director of Patents and Trademarks*